(No Model.)
F. D. GRIFFIN.
DEVICE FOR PRESERVING EGGS.
No. 329,387. Patented Oct. 27, 1885.
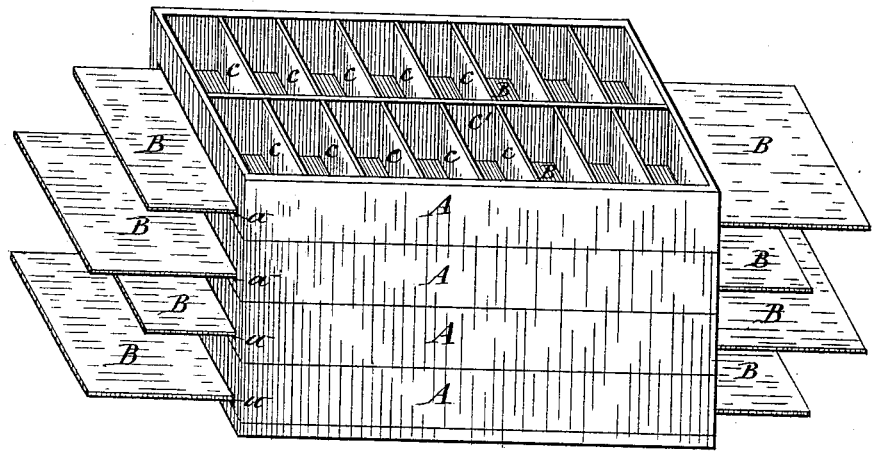
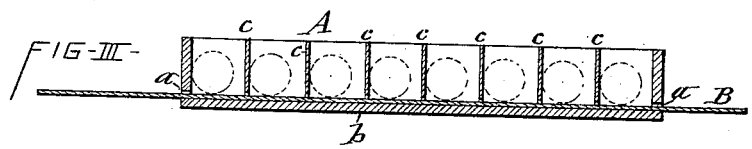
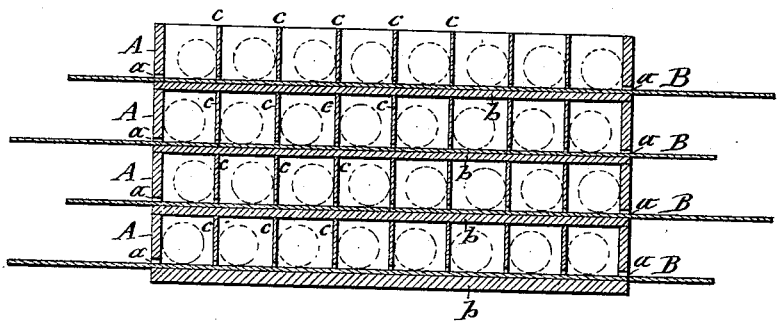
WITNESSES
INVENTOR

UNITED STATES PATENT OFFICE.

FRANKLIN D. GRIFFIN, OF AMBER, NEW YORK.

DEVICE FOR PRESERVING EGGS.

SPECIFICATION forming part of Letters Patent No. 329,387, dated October 27, 1885.

Application filed July 13, 1885. Serial No. 171,464. (No model.)

*To all whom it may concern:*

Be it known that I, FRANKLIN D. GRIFFIN, of Amber, in the county of Onondaga, in the State of New York, have invented new and useful Improvements in Egg-Turners, of which the following, taken in connection with the accompanying drawings, is a full, clear, and exact description.

This invention relates to devices designed for turning eggs, so as to bring different sides thereof to the bottom, and thus guard against the deterioration of the eggs incident to their lying too long on one and the same side; and the invention has particular reference to that class of egg-turning apparatus in which eggs are turned over by the movement of the bottom on which they lie, and barriers arresting the travel of the eggs with the said bottom, the frictional hold of the latter imparting a rolling motion to the eggs. Various devices of that character have been devised, but have failed to come into extensive use, owing either to their cumbersome form or expensive construction or inconvenience of operation. At any rate, none of these prior devices have been adapted to be piled one upon the other in a neat, compact, and perfectly safe manner for storage or for transportation.

My invention is designed to possess these advantages, as will be hereinafter fully explained.

In the annexed drawings, Figure I is an isometric view of my invention, illustrating its adaptability for storing eggs in a neat and compact manner. Fig. II is a vertical longitudinal section of the same, and Fig. III is a longitudinal section of a single apparatus.

A represents a rectangular case, which has a bottom, $b$, rigidly attached thereto, and is divided into separate compartments by transverse partitions $c\ c$. Immediately above the bottom $b$ are horizontal slots $a\ a$, extending through the ends of the case and through the partitions $c\ c$. Upon the bottom $b$ is arranged a movable false bottom, B, which extends from the slots $a\ a$ and to the exterior of the ends of the case. Said false bottom may consist of canvas, or cloth, or paper, or other pliable material, which allows the protruding ends thereof to be folded closely against the exterior of the case. I prefer to use paper of sufficient stiffness to allow it to project nearly horizontally from the ends of the case, so as to be convenient of access for drawing it when desired to turn the eggs in the case. Said protruding ends can be folded down when necessary to render the apparatus convenient for transportation. Each of the compartments formed by the partitions $c\ c$ is of a width slightly greater than that of an egg, and of a length to contain snugly either one lengthwise or two end to end. If of the latter size, the eggs should be laid with their large ends toward each other, so that when turning them by the movement of the false bottom B they are caused to roll from each other. The case A may be made of a width to contain either one or more rows of compartments. If of the latter width, the rows of compartments are to be separated from each other by a longitudinal partition, $c'$. The turning of the eggs is effected by drawing the false bottom B in either direction. The frictional hold of said bottom on the eggs carries them against the partition $c\ c$, as represented by dotted lines in Figs. 2 and 3 of the drawings, and the abutment of said partition, together with the frictional hold of the moving false bottom, imparts a rolling motion to the eggs. By providing the case with the rigid bottom $b$, I am enabled to pile a series of cases A A directly one upon the other, as represented in Figs. 1 and 2 of the drawings, without danger of injuring the eggs or interfering with the operation of the false bottom B of each case independent of the others; and when the cases are thus piled in a store they can be removed from the pile one after another as they become empty. Furthermore, eggs can be safely shipped in my improved apparatus piled as aforesaid by placing a cover over the upper case and surrounding the pile by a crate.

Having described my invention, what I claim as new, and desire to secure by Letters Patent, is—

The apparatus for turning eggs, consisting of the case A, having rigidly attached thereto the solid bottom $b$, and transverse partitions $c\ c$, dividing the case into separate compartments, horizontal slots through the ends and through the partitions of the case immediately above the bottom, and the false bottom B, extending through said slots and to the exterior of the ends of the case, substantially as described and shown.

In testimony whereof I have hereunto signed my name and affixed my seal, in the presence of two attesting witnesses, at Syracuse, in the county of Onondaga, in the State of New York, this 6th day of July, 1885.

FRANKLIN D. GRIFFIN. [L. S.]

Witnesses:
C. H. DUELL,
C. BENDIXON.